REDUCTION OF NOISE IN A CHARACTER RECOGNITION SYSTEM
Filed April 22, 1966
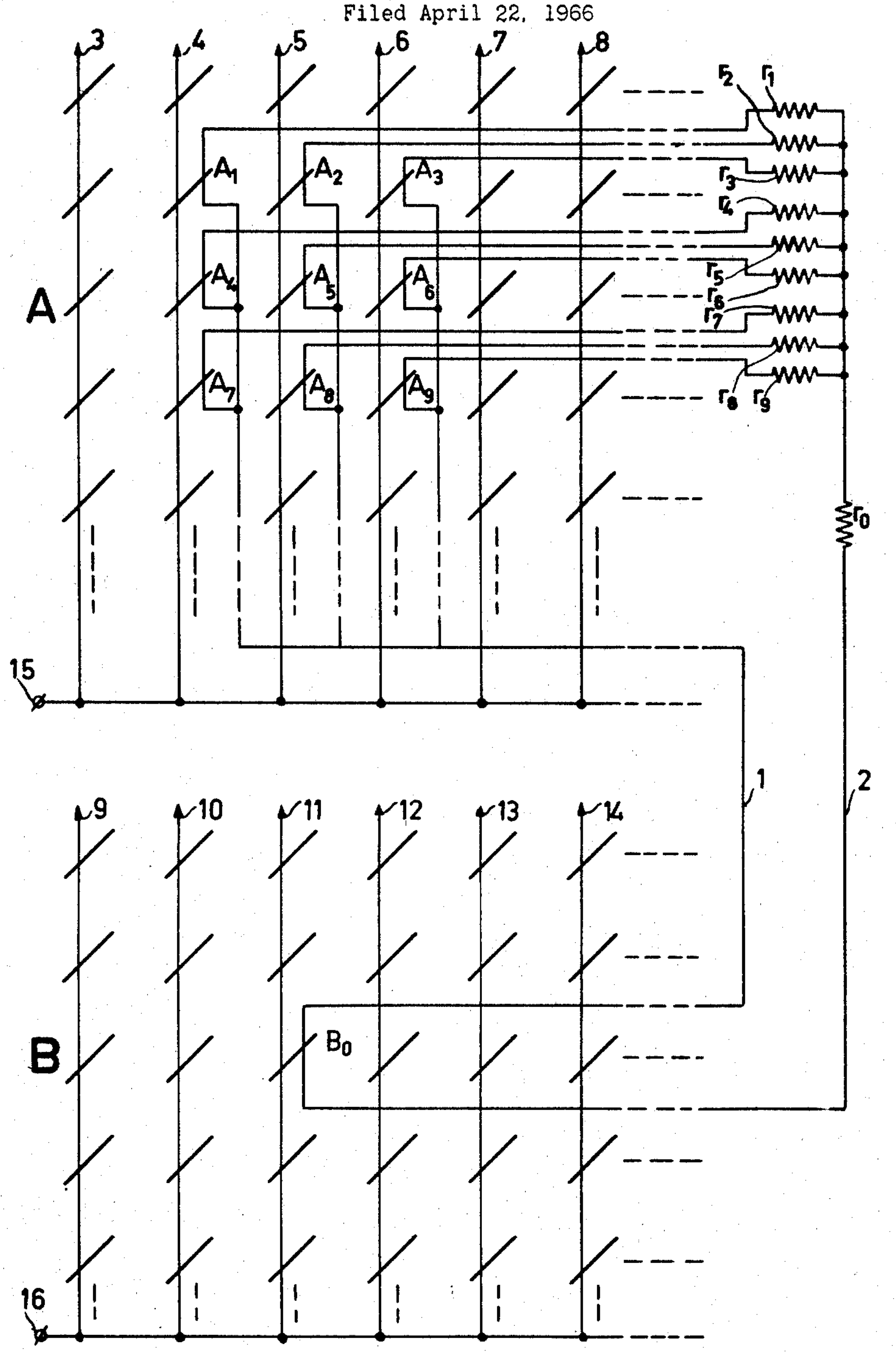
INVENTORS
JOHN A. WEAVER
DAVID J. WOOLLONS
BY
Frank R. Trifari
AGENT United States Patent Office 3,439,353

Patented Apr. 15, 1969

3,439,353

REDUCTION OF NOISE IN A CHARACTER RECOGNITION SYSTEM

John Anthony Weaver, Fellbridge, and David John Woollons, Horsham, England, assignors to North American Philips Company, Inc., New York, N.Y. a corporation of Delaware Filed Apr. 22, 1966, Ser. No. 544,477
Claims priority, application Great Britain, Apr. 23, 1965, 17,234/65
Int. Cl. G11b *5/44*
U.S. Cl. 340—174 7 Claims This invention relates to circuit arrangements for reducing the noise in a black-and-white figure. The figure is stored in the form of clockwise and anticlockwise magnetized storage rings which are arranged in a first storage matrix. The ring at the center of each group of nine adjacent rings disposed in a quadrangle in that first storage matrix is clockwise or anticlockwise magnetized, depending on whether at least five of said nine storage rings are clockwise magnetized or at least five are anticlockwise magnetized.

A circuit arrangement for the purpose specified above may be important for a device intended for recognizing or reading printed or written characters and digits, more particularly if the signs are recognized by the presence of certain characteristics, such as the presence or absence of one or more closed loops, dots, straight lines, and so forth, and hence not by the fact that the characters are written or printed in a precisely prescribed standard form of the signs. However, the invention is independent of the interpretation of the figures concerned and may therefore also be useful for purposes other than that just mentioned.

When a black-and-white figure is stored in a storage matrix, for example with the use of a cathode-ray tube, a variety of causes may result in the stored image containing a certain amount of noise, i.e., certain rings which should have been clockwise magnetized are actually anticlockwise magnetized or vice versa. Such noise may originate for example, from blots on, or creases in, the paper carrying the black-and-white figure to be transferred, from accidental fluctuations of the light, or from interferences occuring in the signal transport.

However, the presence of noise may much impede the process of interpreting or reading the figure stored in the matrix, so that it is desirable that the stored figure should first be freed from noise before being subjected to further processing.

It is known to reduce noise of a black-and-white figure, as has already been mentioned hereinbefore, by magnetizing the ring at the center of each group of nine adjacent rings disposed in a quadrangle either clockwise or anticlockwise, depending on whether at least five of this group of nine rings are magnetized clockwise or at least five are magnetized anticlockwise (see "Proceedings of the Eastern Joint Computer Conference," 1959, page 220, etc.). This process may be repeated several times if necessary.

Any general purpose electronic computer may be prepared for carrying out the described noise reducing process, but this provides a solution which is too slow and too expensive for many uses. Consequently an object of the invention is to provide a circuit arrangement which is especially intended for the noise reducing process. According to the invention, this object is attained by the fact that the circuit arrangement comprises, in addition to the aforementioned first storgae matrix, a second storage matrix. Each group of nine adjacent storage rings disposed in a quadrangle in the first storage matrix is coupled to that storage ring of the second storage matrix which corresponds to the ring at the center of the relevant group of nine rings, and in such manner that due to switching anticlockwise of all of said nine rings which were initially clockwise magnetized, a clockwise driving magnetomotive force is produced in said ring of the second storage matrix which magnetomotive force is directly proportional to the number of switching rings.

This noise reducing process may be carried out in several ways:

(1) The states of magnetization of the rings of the first storage matrix are transferred in corrected form one after another to the second storage matrix, this corrected state of magnetization being taken over in the first storage matrix before the state of magnetization of the next following ring is corrected;

(2) The states of magnetization of the ring of the same row of column of the first storage matrix are simultaneously transferred in corrected form to the second storage matrix, these corrected states of magnetization being taken over in the first storage matrix, before the states of magnetization of the rings of the succeeding row or column are corrected;

(3) The states of magnetization of all the rings of the first storage matrix are simultaneously transferred in corrected form to the second storage matrix.

During the experiments carried out with each of said three methods by means of a general purpose electronic computer, the three methods have been found to give in general the same final result so that the last method, being by far the quickest, is preferable, even if the use of this method necessitates a little more iterations of the noise reducing process. However, it may occur that the second or the first method is preferable for certain types of figures and for certain forms of noise. The circuit arrangement according to the invention may be designed for each of said three methods.

In order that the invention may be readily carried into effect, it will now be described in detail, by way of example, with reference to the accompanying diagrammatic drawing showing one embodiment of a circuit arrangement according to the invention intended especially for use of the third method.

The figure shows the first and second storage matrices A and B, respectively. In the example described, the two matrices are of the same size and to each ring of the first matrix corresponds just one ring of the second matrix and vice versa.

$A_1, A_2 \ldots A_9$ are nine adjacent rings, disposed in a quadrangle, of the first matrix A, the ring $A_5$ being at the centre of the quadrangle. The ring $A_5$ corresponds to the ring $B_0$ of the second matrix. The nine rings $A_1 \ldots A_9$ are together coupled to the ring $B_0$ by means of wires 1 and 2 and resistors $r_0, r_1, r_2 \ldots r_9$.

Through the rings of the columns of the first matrix A are threaded wires 3, 4, 5, 6, 7, 8 . . . All the rings of the first matrix A are magnetized anticlockwise by energizing said wires.

Through the rings of the columns of the second matrix B are threaded wires 9, 10, 11, 12, 13, 14. . . . All the rings of the second matrix B are magnetized anticlockwise by energizing said wires.

Each group of nine adjacent rings disposed in a quadrangle of the first matrix A is coupled in the described manner to a ring of the second matrix.

The circuit operates as follows:

Let it be assumed that a given black-and-white figure is stored in the first matrix in the form of clockwise and anticlockwise magnetized rings. If, now, a current pulse of sufficient strength and duration is applied to a terminal 15, all rings of the first matrix A are set to the anticlockwise magnetized state, thus inducing in the wires 1 and 2 a current pulse which is proportional to the number of switching rings of the group $A_1 \ldots A_9$ and hence to the number of initially clockwise magnetized rings of this group. The assembly is proportioned such that a current pulse originating from five switching rings is just strong enough to switch the ring $B_0$ from the clockwise to the anticlockwise magnetized state, but a current pulse originating from four switching rings is not strong enough to do this. If desired, a current pulse may be applied to a terminal 16 at the same time as the current pulse is applied to the terminal 15 so that all the rings of the second matrix receive a counteracting bias current. This makes possible to replace the critical number five by another number only by changing the strength of the current pulse applied to the terminal 16.

It will be evident that the circuit arrangement may be extended still further. Thus each group of nine rings of the second matrix B may be coupled in a similar manner to the rings of the first matrix. A thus permitting to repeat the noise reducing process in a very efficient way. For the same purpose the circuit arrangement may be designed so that all the signals stored in the rings of the second matrix B can be transferred to the first matrix A. This may be effected in known manner.

What is claimed is:

1. A device for reducing the noise content of a binary character stored in a primary storage matrix comprising a plurality of rows and columns of discrete primary bistable storage elements, each of said primary storage elements having an initial state determined by the nature of the character stored in said primary matrix, a secondary storage matrix including a plurality of rows and columns of discrete secondary bistable storage devices, a plurality of transfer conductor groups defining a plurality of submatrices within said primary storage matrix, each of said submatrices comprising a plurality of said primary storage elements and having a central primary storage element, each of said groups coupling a respective submatrix to one of said secondary storage elements of said secondary storage matrix, the state of said secondary storage element being determined by the total state of all of said primary storage elements comprising said submatrix, and means for resetting the central primary storage element of each of said submatrices in accordance with the state of each said secondary storage elements.

2. The combination of claim 1 wherein each of said storage devices comprises a magnetic core.

3. The combination of claim 1 wherein each of said submatrices comprises a block having an odd number of primary storage elements on each side thereof.

4. A device for reducing the noise content of a binary character stored in a primary storage matrix comprising a plurality of rows and columns of discrete primary bistable storage elements, each of said primary storage elements having an initial state determined by the nature of the character stored in said primary matrix, a secondary storage matrix including a plurality of rows and columns of discrete secondary bistable storage devices, a plurality of transfer conductor groups, defining a plurality of submatrices within said primary storage matrix, each of said submatrices comprising a plurality of said primary storage elements and having a central primary storage element, each of said submatrices overlapping adjacent submatrices such that each primary storage element over an operative area of said primary storage matrix is a central element of one of said submatrices, each of said groups coupling a respective submatrix to one of said secondary storage elements, the state of said secondary storage element being determined by the total state of all of said primary storage elements comprising said submatrix, and means for resetting the central primary storage element of each of said submatrices in accordance with the state of each said secondary storage element.

5. The combination of claim 4 wherein each of said storage devices comprises a magnetic core.

6. The combination of claim 4 wherein each of said submatrices comprises a block having an odd number of primary storage elements on each side thereof.

7. A device for reducing the noise content of a binary character stored in a primary storage matrix comprising a plurality of rows and columns of discrete primary bistable storage elements, each of said primary storage elements, having an initial state determined by the nature of the character stored in said primary matrix, a secondary storage matrix including a plurality of rows and columns of discrete secondary bistable storage devices, and a plurality of transfer conductor groups defining a plurality of submatrices within said primary storage matrix, each of said submatrices comprising a plurality of said primary storage elements and having a central primary storage element, each of said groups coupling a respective submatrix to one of said secondary storage elements of said secondary storage matrix, the state of said secondary storage element being determined by the total state of all of said primary storage elements comprising said submatrix.

References Cited

UNITED STATES PATENTS 3,289,164 11/1966 Rabinow ---------- 340—146.3

OTHER REFERENCES

Bomba, 1959 Proceedings of the Eastern Joint Computer Conference, p. 220.

BERNARD KONICK, *Primary Examiner.*

B. L. HALEY, *Assistant Examiner.*

U.S. Cl. X.R.

340—146.3